United States Patent Office 3,773,755
Patented Nov. 20, 1973

3,773,755
CONVERSION OF CYTIDYLIC ACID INTO ARACYTIDINE-3'-PHOSPHATE
Joseph Nagyvary, Byran, Tex., assignor to the United States of America as represented by the Secretary, Department of Health, Education, and Welfare
No Drawing. Continuation-in-part of application Ser. No. 868,913, Oct. 23, 1969. This application Dec. 9, 1970, Ser. No. 96,648
Int. Cl. C07d 51/52
U.S. Cl. 260—211.5 R                                    7 Claims

ABSTRACT OF THE DISCLOSURE

A method for synthesizing aracytidine-3'-phosphate by the low temperature rearrangement of substituted cytidine-2',3' cyclic pyrophosphates is described.

---

This application is a continuation-in-part of U.S. patent application Ser. No. 868,913, filed Oct. 23, 1969.

A method for preparing aracytidine-3' phosphate is disclosed by Joseph Nagyvary in U.S. patent application Ser. No. 868,913, entitled, "A New Compound, $O^2,2'$-Cyclocytidine-3' Phosphate and Process for Preparing Same." The method disclosed in that application involves the thermal rearrangement of dialkyl or trialkylsilylated cytidine-2',3' cyclic phosphate at relatively high temperature. Additional work related to the production of cytidine nucleotides, including some similar to the starting materials in the instant invention, is described by Joseph Nagyvary in U.S. Patent No. 3,463,772, issued Aug. 26, 1969. The instant invention involves the synthesis of aracytidine-3' phosphate and related derivatives by the rearrangement of substituted cytidine-2',3' cyclic pyrophosphates and the corresponding sulfonic anhydrides at relatively low temperatures.

Efforts to convert ribonucleotides directly into arabinonucleotides have been motivated by the fact that the arabinonucleotides are important antiviral and carcinostatic drugs. For example, see Renis et al., J. Med. Chem., 10: 777 (1967) and Schrecker et al., Cancer Res., 28: 802 (1969). The first synthesis of an arabinonucleotide from a ribonucleotide was by Walwick et al., Proc. Chem. Soc., 84 (1959)). Walwick et al., process consisted of heating cytidylic acid in polyphosphoric acid to 80°–100° C. This resulted in the formation of a 2',3' cyclic pyrophosphate intermediate. The end product was 3',5' diphosphate of 1-B-D arabinofuranosylcytosine. The diphosphate product obtained by Walwick et al. is not satisfactory as a synthetic intermediate because both the 3' and 5' positions are blocked by the same substituent group. To be a satisfactory synthetic intermediate one of these two positions must be either unsubstituted or the substituents in the 3' and 5' positions must be different.

The synthesis of aracytidine-3' phosphate and related derivatives from substituted cytidine-2',3' cyclic phosphate at low temperature is accomplished by the rearrangement of fully or partially substituted cytidine-2',3' cyclic pyrophosphate or sulfonic anhydride. This method is, therefore, useful for the synthesis of aracytidine derivatives which contain temperature sensitive groups in the $N^4$ and 5' positions. The substituents on the $N^4$ and 5' positions may be any acyl group with a chain of C–8 to C–18. The chain may be substituted or unsubstituted, saturated or unsaturated. Substituents on the chain may be aliphatic aromatic or heterocyclic and any substituent is suitable so long as it does not contain an amino or hydroxyl function. Typical examples of suitable acyl groups are acetyl, trimethylacetyl, benzoyl, chlorobenzoyl, anisoyl, pivaloyl, stearoyl, etc. Alternatively, the $N^4$ and 5' protecting substituent groups may be different. For example, any combination of the following groups is feasible:

$N^4$=any acyl group such as acetyl, benzoyl, anisoyl, pivaloyl, etc.;
5'=any acyl group such as trimethylacetyl, tosyl, substituted tosyl, mesyl, trityl or substituted trityl such as p-methoxy trityl, any acetal or one of the halogens, Cl, Br or I (see, for example, Lohrmann & Khorana, J. Am. Chem. Soc., 86: 4188 (1964); Clark et al., J. Chem. Soc., 2952 (1951); Verheyden and Moffat, J. Org. Chem., 2319 (1970). These compounds are unstable at 80° C. and cannot, therefore, be used in Walwick et al. process.

The method of synthesizing aracytidine-3' phosphate by the low temperature rearrangement of substituted cytidine-2',3' cyclic pyrophosphates is summarized by the following chemical equations:

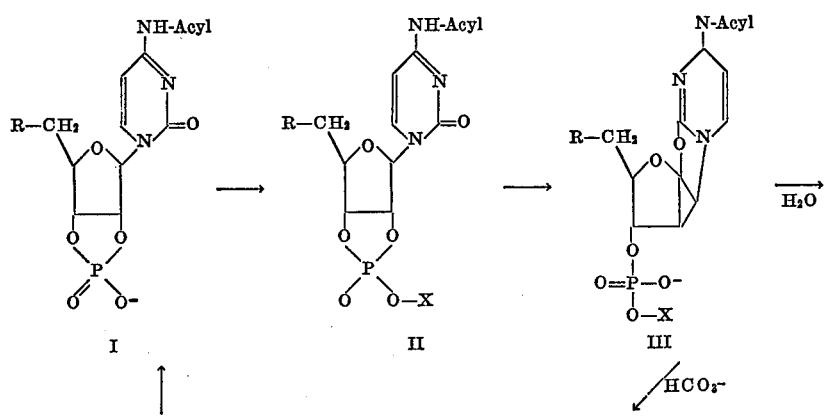

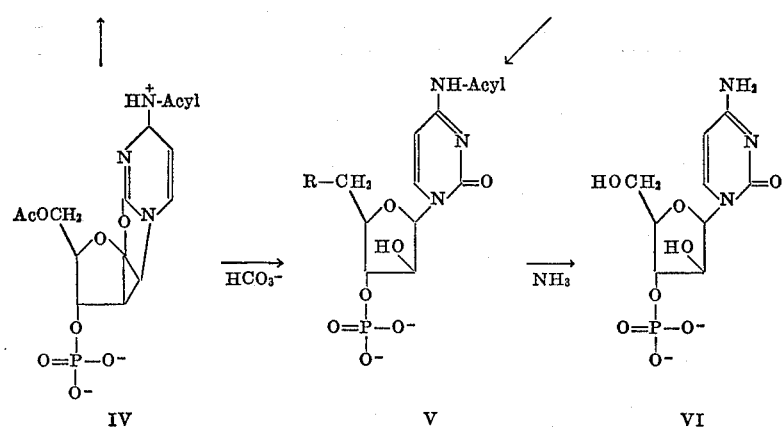

The 5' position may be substituted by R wherein:
R=acyloxy (e.g. acetyloxy), acyl, mesyl, tosyl, p-methoxytrityl, tetrahydropyranyloxy or the halogens Cl, Br, or I.
X=diphenylphosphoryl, substituted diphenylphosphoryl, mesyl, tosyl, alkylsulfonate, substituted alkyl sulfonate, aryl sulfonates such as phenyl sulfonate, p-bromophenyl sulfonate and naphthyl sulfonate.

Note: While compound V wherein the 5' substituent is other than acyloxy can be converted to Compound VI the R substituent compounds other than acyloxy are better suited as intermediates in the synthesis of compounds other than aracytidine-3'-phosphate.

The substituted 2',3' cyclic phosphate (I) is dissolved in a suitable anhydrous solvent such as a mixture of dioxane and a tertiary amine which does not hinder solubility, such as tri-n-butylamine, tri-n-octylamine, tri-n-pentyl amine, tri-n-propyl amine, and tri-n-hexylamine. Dimethyl formamide or hexamethylphosphotriamide may be substituted for dioxane. The amount of dioxane, dimethylformamide and hexamethylphosphotriamide is critical only in that an amount sufficient to produce a clear solution is required. The solvent mixture should contain about 2 equivalents of amine per equivalent of a subsequently added activating agent. The amine serves to bind any acid which may be formed by the hydrolysis of the activating agent due to inherent moisture, 1.2–1.6 equivalents per equivalent of Compound I of a fresh anhydrous activating agent such as diphenylphosphoryl chloride, methanesulfonyl chloride, p-toluenesulfonyl chloride, bis-p-nitrophenyl phosphoryl chloride or the corresponding anhydrides is added slowly with cooling over a period of 5–15 minutes in order to prevent the reaction mixture from becoming overheated.

The amount of activating agent added is critical. Ideally one equivalent is required, but more may be necessary if the reagents are not completely anhydrous. Too much activating agent results in the formation of excessive amounts of fluorescent byproducts and a deficiency reduces the yield of the desired end product. The rearrangement proceeds through two unstable intermediates (II and III). The rearrangement is allowed to go to about 50% completion as determined by electrophoresis and paper chromatography. This takes about 15 hours at 20° C. or 2 hours at 50° C. Any temperature in the range of 0° C. to 50° C. is satisfactory, but at the lower temperatures the reaction proceeds very slowly. Prolongation beyond 50% is undesirable because of the concomitant formation of fluorescent byproducts. The substitution of dimethylformamide for dioxane as the solvent substantially increases the rate of rearrangement, but it also results in the formation of more fluorescent byproducts. Hydroylsis of Compound (III) with trimethylammonium bicarbonate produces 5'-0,$N^4$-disubstituted aracytidine-3' phosphate (V). When water alone is used for hydrolysis a reverse rearrangement (III→IV→I) takes place. Separation of the intermediate (V) is accomplished on a dimethylaminoethyl (DEAE) cellulose (bicarbonate) column). The $N^4$ and 5' substituent groups are then removed to produce aracytidine-3' phosphate (VI) by reacting Compound (V) with methanolic ammonia. Aracytidine-3' phosphate is purified by adsorption on a Dowex 1–X2 (formate) column and elution with dilute formic acid. Alternatively, hydrolysis of Compound (III) can be achieved with 1 N KOH instead of triethylammonium bicarbonate in which case the isolation of aracytidine-3' phosphate can be accomplished directly on a Dowex 1–X2 (formate) column with the omission of the DEAE column fractionation.

A preferred embodiment of this invention utilizes an electron donating substituent group such as dimethylaminoethylene for protecting the $N^4$ amino group in which case the 5' hydroxy group does not need to be protected. The chemical equations for this process are shown below:

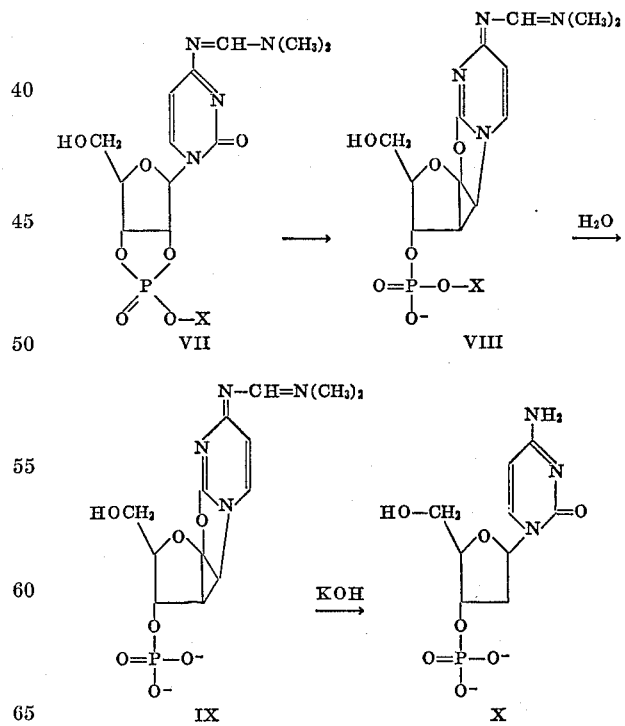

X=diphenylphosphoryl, substituted diphenylphosphoryl, mesyl, tosyl, alkyl sulfonate or aryl sulfonate $N^4$ - dimethylaminomethylene-cytidine 2',(3') phosphate (VII) is prepared by the general method of Zemlicka, Coll. Czech, Chem. Comm., 28: 1060 (1963) in quantitative yield. The $N^4$-dimethylaminoethylene-cytidine-2',(3') phosphate is dissolved in a suitable solvent such as one of those disclosed supra. 2.5 equivalents of an activating agent such as p-toluenesulfonyl chloride is added slowly with cooling. One equivalent of the activating agent is needed to generate the cyclic phosphate, the second equivalent generates the mixed anhydride (VII) and 0.5 equivalent is a variable excess which is used to hydrolyze any inherent moisture. The unstable anhydride formed rearranges instantaneously even at temperatures below room temperatures to produce the intermediate (VIII). Hydrolysis with ice produces $N^4$-dimethyl-aminoethylene-$O^2,2'$-cyclocytidine-3' phosphate (IX). This compound is relatively stable in water at neutral pH and can be isolated electrophoretically at pH 5.5 (max. 325 m$\mu$). It is partially hydrolyzed on freeze drying or at higher ionic strength. Upon hydrolysis with dilute KOH aracytidine-3' phosphate (X) is obtained which, upon separation of a Dowex 1–X2 column (formate, 1.5×40 cm.), emerges as the third peak on a gradient elution with formic acid (3 l. $H_2O$–3 l. 0.03 M) following the isomeric ribocytidylic acids.

EXAMPLE I 1 mmole of 5'-0,$N^4$-diacetylcytidine-2',3'-cyclic phosphate prepared by the method of Michelson, J. Chem. Soc., 3655 (1959) is converted to the tri-n-butyl ammonium salt which is then dissolved in a mixture of 20 ml. of anhydrous dioxane and 2 ml. of tri-n-butylamine. 1.2–1.6 equivalents of p-toluenesulfonyl chloride is added slowly with cooling so that the temperature of the reaction mixture is maintained at about 5° C. The reaction is then allowed to proceed at room temperature until it is about 50% complete as determined by paper electrophoresis and/or paper chromatography, which takes about 15–24 hours. The same result can be obtained in 2–3 hours by maintaining the temperature of the reaction mixture at about 50° C. The unstable intermediate, $O^2,2'$-cyclocytidine (III) is hydrolyzed with 5 ml. of 1 M triethylammonium bicarbonate. The 5'–0,$N^4$-diacetylaracytidine-3' phosphate thus formed (V) is separated from the reaction mixture on a DEAE (bicarbonate) column. The acetyl substituent groups are removed by reacting Compound (V) with an excess of methanolic ammonia for 1 or more hours. The resulting aracytidine-3' phosphate (VI) is purified by adsorption on a Dowex 1–X2 (formate) column and elution with dilute formic acid. The eluate upon freeze drying yielded 155 mg. of aracytidine-3' phosphate. The analysis of the product was C=33.35%, H=4.69%, N=12.16% and P=9.34%. Calculated for $C_9H_{14}N_3O_8P$ (323.0) C=33.45, H=4.35, N=13.01, P=9.60. The 100 MHz, NMR spectrum in $D_2O$ relative to acetone as internal standard gave at pD 7: H–6 $\delta$ 5.65 (8); H–5, 3.83 (8); H–1', 4.03 (3); at pD 4; H–6, 5.87 (8); H–5, 4.02 (8); H–1', 3.99 (3). The UV in water exhibited $\gamma_{max}$. 275 m$\mu$ (10,600), 211 (10,400) and in 0.1 N HCl $\gamma_{max}$. 279 (13,700), 212 (9,700). The product was found to be identical to a commercial sample of aracytidine-3' phosphate.

EXAMPLE II

The procedure of Example I is followed except that diphenylphosphoryl chloride substituted for p-toluenesulfonyl chloride as the activating agent.

EXAMPLE III

The procedure of Example I is followed except that bis-p-nitrophenylphosphoryl chloride is substituted for p-toluenesulfonyl chloride as the activating agent.

EXAMPLE IV

The procedure of Example I is followed except that hexamethylphosphotriamide is substituted for dioxane as the solvent.

EXAMPLE V

The procedure of Example I is followed except that the starting material can be 5'-mesyl,$N^4$-acetylcytidine-2',3'-cyclic phosphate prepared according to the methods of Michelson. I.e. $N^4$-acetylcytidine-2',3'-cyclic phosphate can be prepared according to Michelson (J. Chem. Soc. 3655 (1959)) and this compound can then be mesylated 979 (1962).)

EXAMPLE VI

The procedure of Example I is followed except that the starting material 5'-0-chloro-$N^4$-acetyl cytidine-2',3' cyclic phosphate can be used. This compound can be obtained by chlorinating cytidine-2',3'-cyclic phosphate according to the method of Srivastava, Nagpal and Dhar (Experientia 25, 356 (1969)) in yields of over 50% after purification by DEAE cellulose chromatography. Acetylation with acetic anhydride in pyridine is virtually quantitative.

EXAMPLE VII

The procedure of Example I was followed except the intermediate (III) was hydrolyzed with 5 ml. of 1 N KOH instead of triethylammonium bicarbonate and the DEAE fractionation step was omitted.

EXAMPLE VIII

The $N^4$-dimethylaminomethylene derivative of 2',(3')-cytidylic acid was prepared according to the method of Zemlicka (Coll. Czech. Chem. Comm., 28: 1060 (1963)). 1 mmole of this compound was dissolved in a mixture of 30 ml. of dimethylformamide (DMF) and 3 ml. of tri-n-butylamine. 2.5 equivalents of p-toluenesulfonyl chloride was added with cooling so as to maintain the reaction temperature at about 5° C. The initially formed mixed anhydride rearranged instantaneously to form compound VIII. This compound was hydrolyzed with ice to produce $N^4$-dimethylamino-$O^2,2'$-cyclocytidine-3' phosphate (IX) in 70–80% yield. Upon hydrolysis with dilute KOH aracytidine-3' phosphate (X) was obtained which was purified on a Dowex 1–X2 (formate, 1.5×40 cm.) column. Upon gradient elution with formic acid (3 l. $H_2O$–3 l. 0.03 M) aracytidine-3' phosphate emerge as the 3rd peak following the isomeric ribocytidylic acids. The product was identified by the same procedures set forth in Example I.

EXAMPLE IX

The procedure of Example I except that the activating agent was methane sulfonic anhydride instead of p-toluene sulfonyl chloride in which case the substituent on the 5' position of the reactive intermediate [(V)] is mesyl.

I claim:
1. A method for synthesizing aracytidine-3' phosphate and related derivatives by low temperature rearrangement of 2',3'-substituted cyclic phosphates which comprises the steps of:

dissolving a substituted 2',3'-cyclic phosphate with the structure

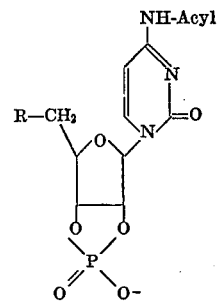

wherein R is acetyloxy, aliphatic acyl of 8 to 18 carbon atoms, mesyl, tosyl, p-methoxy tosyl, tetrahydropyranzoloxy, Cl, Br, or I, in a mixture of an anhydrous organic solvent and a tertiary alkyl amine;

reacting said substituted 2',3'-cyclic phosphate with 1.2–1.6 equivalents of an activating agent selected from the group consisting of diphenylphosphoryl chloride, methanesulphonyl chloride, p-toluenesulfonyl chloride, bis-p-nitrophenyl-phosphoryl chloride and their corresponding anhydrides until the reaction is about 50% complete while cooling the reaction mixture to prevent the temperature of the reaction mixture from exceeding 50° C.;

hydrolyzing the reaction product with triethylammonium bicarbonate; separating the intermediate thus formed from the reaction mixture; removing the $N^4$ and 5' substituent groups by reacting said intermediate with an excess of methanolic ammonia; and recovering aracytidine-3' phosphate from the reaction mixture.

2. The method of claim 1 wherein said anhydrous solvent is selected from the group consisting of dioxane, dimethylformamide and hexamethylphosphortiamide and said tertiary alkyl amine is selected from the group consisting of tri-n-butylamine and tri-n-octylamine.

3. The method of claim 1 wherein the temperature of said reaction mixture during the reaction of said substituted 2',3'-cyclic phosphate with said activating agent is maintained at about 5° C. for about 15-24 hours.

4. The method of claim 1 wherein the temperature of said reaction mixture during the reaction of said substituted 2',3'-cyclic phosphate with said activating agent is maintained at about 50° C. for about 2-3 hours.

5. The method of claim 1 wherein said reaction product of 2',3'-cyclic phosphate and said activating agent is hydrolyzed with 1 N KOH and aracytidine-3' phosphate thus produced is recovered from the reaction mixture.

6. A method for synthesizing aracytidine-3' phosphate and related derivatives by low temperature rearrangement of 2',3'-substituted cyclic phosphates which comprises the steps of:

dissolving $N^4$-dimethylaminoethylene - cytidine - 2',(3') phosphate in a mixture of an anhydrous organic solvent and a tertiary alkyl amine;

reacting said $N^4$-dimethylaminomethylene-cytidine-2'-(3') phosphate with about 2.5 equivalents of an activating agent selected from the group consisting of diphenylphosphoryl chloride, methanesulfonyl chloride, p-toluenesulfonyl chloride, bis-p-nitrophenylphosphoryl chloride and their corresponding anhydrides while cooling the reaction mixture to maintain a temperature of about 5° C.;

hydrolyzing the reaction product with ice followed by further hydrolysis with dilute KOH; and recovering aracytidine-3' phosphate from the reaction mixture.

7. The method of claim 6 wherein said anhydrous solvent is selected from the group consisting of dioxane, dimethyl formamide and hexamethylphosphotriamide and said tertiary alkyl amine is selected from the group consisting of tri-n-butylamine and tri-n-octylamine.

References Cited
UNITED STATES PATENTS

| | | | |
|---|---|---|---|
| 3,462,416 | 8/1969 | Hanze et al. | 260—211.5 R |
| 3,463,772 | 8/1969 | Nagyvary | 260—211.5 R |

LEWIS GOTTS, Primary Examiner

J. R. BROWN, Assistant Examiner